United States Patent
Barlet-Gouedard et al.

(10) Patent No.: US 7,449,061 B2
(45) Date of Patent: Nov. 11, 2008

(54) HIGH TEMPERATURE CEMENTS

(75) Inventors: Véronique Barlet-Gouedard, Chatenay Malabry (FR); Bruno Goffe, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 110 days.

(21) Appl. No.: 10/595,435

(22) PCT Filed: Oct. 26, 2004

(86) PCT No.: PCT/EP2004/012189

§ 371 (c)(1), (2), (4) Date: Aug. 28, 2006

(87) PCT Pub. No.: WO2005/040060

PCT Pub. Date: May 6, 2005

(65) Prior Publication Data

US 2007/0125271 A1    Jun. 7, 2007

(30) Foreign Application Priority Data

Oct. 27, 2003   (GB) .................... 0324967.9

(51) Int. Cl.
*C04B 7/13* (2006.01)
(52) U.S. Cl. .................... 106/713; 106/737; 106/738
(58) Field of Classification Search .......... 106/713, 106/692, 737, 738
See application file for complete search history.

(56) References Cited

U.S. PATENT DOCUMENTS

| | | | |
|---|---|---|---|
| 3,563,313 A * | 2/1971 | Spangle | |
| 4,642,137 A | 2/1987 | Heitzmann et al. | |
| 4,877,452 A | 10/1989 | Roussel et al. | |
| 4,935,060 A | 6/1990 | Dingsoyr | |
| 5,158,613 A | 10/1992 | Sargeant et al. | |
| 5,900,053 A | 5/1999 | Brothers et al. | |
| 6,143,069 A | 11/2000 | Brothers et al. | |
| 6,332,921 B1 | 12/2001 | Brothers et al. | |
| 6,367,556 B1 | 4/2002 | Moore | |
| 6,488,763 B2 | 12/2002 | Brothers et al. | |
| 6,911,078 B2 * | 6/2005 | Barlet-Gouedard et al. | 106/692 |
| 2005/0160945 A1 * | 7/2005 | Barlet Gouedard et al. | 106/718 |

FOREIGN PATENT DOCUMENTS

| | | |
|---|---|---|
| EP | 0621247 | 10/1994 |
| EP | 0922013 | 6/1999 |
| GB | 1525236 | 9/1978 |
| GB | 2385326 | 8/2003 |
| GB | 2389578 | 12/2003 |
| WO | 99/01397 | 1/1999 |
| WO | 01/09056 | 2/2001 |
| WO | 01/70646 | 9/2001 |
| WO | 03/068708 | 8/2003 |

* cited by examiner

*Primary Examiner*—Paul Marcantoni
(74) *Attorney, Agent, or Firm*—David Cate; Robin Nava; Dale Gaudier (57) ABSTRACT

A method of designing a cement composition comprises determination of the temperature to which the composition will be exposed in situ; determination of a stable, thermodynamic equilibrium composition of a $CaO-Al_2O_3-SiO_2-H_2O$ (CASH) mineral system in the [xonotlite/wollastonite]-grossulaire-anorthite or grossulaire-anorthite-quartz triangles of the Si—Ca—Al phase diagram with a possible contribution of iron and/or magnesium, analogous to the cement when set, at the determined temperature; determining proportions of cement and mineral oxides required to provide a mixture having the determined composition; and defining a series of particulate materials of predetermined particle sizes and densities, comprising cement and mineral oxides in the determined proportions.

19 Claims, 12 Drawing Sheets

FIGURE 27 wollastonite glass anorthite

FIGURE 28 glass

Garnet-grossular

FIGURE 29

HIGH TEMPERATURE CEMENTS

The present invention relates to cement compositions for high-temperature applications, and to methods for designing such compositions and to articles made from such compositions. In particular, the invention provides silico-aluminous modified Portland cement for high temperature applications and fire safety protection.

WO 03/068708 describes techniques for producing cement compositions capable of withstanding relatively high temperatures, involving determination of the temperature to which the slurry will be exposed in situ; determination of a stable, thermodynamic equilibrium composition of a CaO—$Al_2O_3$—$SiO_2$—$H_2O$ (CASH) mineral system, analogous to the cement when set, at the determined temperature; determining proportions of cement and mineral oxides required to provide a mixture having the determined composition; and defining a series of particulate materials of predetermined particle sizes and densities, comprising cement and mineral oxides in the determined proportions. One suitable range of compositions falls in the Margarite-Quartz-pectolite region of the Si—Ca—Al (Na) phase diagram and optimizes early formation of Anorthite. Such compositions often involve the use of kaolin, metakaolin and/or calcination products of metakaolin, and are suitable for use at temperatures in the range 250° C.-900° C.

EP 0 922 013 proposes compositions suitable for certain high temperature applications which promote the formation of calcium hydro garnets from the series $[SiO_4]Ca_3M^{3+}$, where M=Al (grossular) or M=Fe (andradite).

WO 01/70646 proposes cement compositions to provide a cement matrix in the Si—Ca—Al triangle in one of the margarite-hauyne-[epidote/purnpellyite], hauyne-prehnite [epidote/pumpellyite] and haiiyne-prehnite-pectolite composition triangles. Such compositions are proposed as suitable for use in conditions of elevated temperature and pressure (250° C.-300° C.; 20 MPa).

Other approaches to the problems of high temperature cements can be found in U.S. Pat. No. 4,642,137; U.S. Pat. No. 4,877,452; U.S. Pat. No. 4,935,060; U.S. Pat. No. 5,158,613; U.S. Pat. No. 5,900,053; U.S. Pat. No. 6,143,069; U.S. Pat. No. 6,332,921; U.S. Pat. No. 6,367,556; and U.S. Pat. No. 6,488,763.

EP 0 621 247 describes cement compositions having high solids content while being able to form stable slurries. WO 01/09056 describes the application of this technology to low density slurries.

The degradation mechanisms of cement when exposed to high temperatures are relatively well-known, and are addressed, in part, by the proposals summarized above. Up to 400° C., the main stable cement phases are hydrous. Thus, when presented with fast heating rates and very high temperatures and intensities (for example such as those found in hydrocarbon fires), such cements undergo spalling caused by the explosive effect of the increase in pore water pressure generated by the dehydration of the minerals, and due to the saturation vapour pressure due to the inherent moisture content of the cement. In such cases, major physical damage occurs to the cement, often leading to failure of the structure of which it is part.

In the construction industry, the approach to heat resistance is often to use heat-resistant aggregates in the cement in an attempt to stabilise the set cement when exposed to very high temperatures. However, since the cement matrix is unchanged, the problems of degradation and spalling still occur.

The present invention seeks to provide new concrete formulations in which the conditions leading to degradation such as spalling at high temperatures is reduced or avoided.

In accordance with one aspect of the present invention, there is provided a cement composition comprising a mixture of cement and minerals contributing silicon, calcium and aluminium (with possible contribution of iron and magnesium) to the mixture, wherein the composition of the mixture lies substantially in the [xonotlite/wolastonitej-grossular-anorthite or grossular-anortliite-quartz triangles of the Si—Ca—Al phase diagram.

Articles according to the invention comprise pre-cast units made from a cement composition according to the invention and subjected to curing under elevated temperature.

A method of designing a cement composition according to the invention comprises determination of the temperature to which the composition will be exposed in situ; determination of a stable, thermodynamic equilibrium composition of a CaO—$Al_2O_3$—$SiO_2H_2O$ (CASH) mineral system (with possible contribution of FeO and MgO) in the [xonotlite/wollastonitej-grossular-anorthite or grossular-anorthite-quartz triangles of the Si—Ca—Al phase diagram, analogous to the cement when set, at the determined temperature; determining proportions of cement and mineral oxides required to provide a mixture having the determined composition; and defining a series of particulate materials of predetermined particle sizes and densities, comprising cement and mineral oxides in the determined proportions.

The present invention resides in the recognition that rocks known as skarns which are extremely stable at high temperatures and have compositions that are similar to those that can be obtained by combining cement and mineral oxides. Skarns are rocks resulting from granitic magma intrusion inside carbonate layers. These high temperature conditions (500-700° C.) combined with silicon and aluminum contribution, transform the initial mineralogy of carbonate layers into high temperature stable rocks formed by anhydrous calco-silicates and calco-alumino-silicates, such as wollastonite, anorthite. grossular, diopside and idocrase, with the remains of the initial formation carbonates in various proportions depending on the temperature reached. The present invention is based on the recognition that it is possible to obtain skarn-like compositions by modifying the chemical composition of Portland cement by the inclusion of mineral oxides. In doing so, the problems of the pervious technique are addressed since the cement matrix becomes heat resistant and so less susceptible to heat degradation. The invention also has the advantage that it can be implemented in a number of forms allowing pumping, spraying and formation or pre-cast articles.

Compared to a Portland cement the skarn bulk composition is mainly characterized by and alumina and silica enrichment. As skams can be considered as a high temperature stable model material, the Portland cement formulations are modified according to the invention by the addition of mineral oxides to reach the skarn bulk composition.

Figure 1:
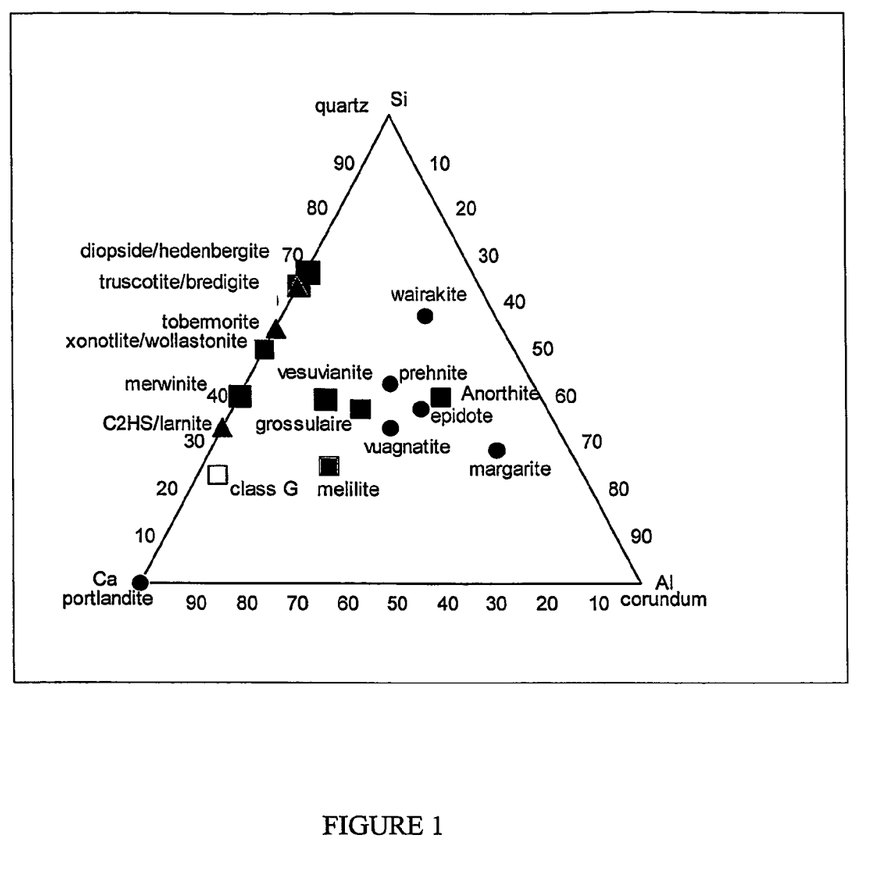
FIG. 1 shows mineral phases known to be stable in natural calcium-rich systems plotted of in the $CaO-Al_2O_3-SiO_2$ ternary diagram ($H_2O$ in excess, FeO and MgO possibly present)

The proportions of cement and mineral oxides required to form a stable cement can be determined from general thermodynamic rules, phase relations between minerals and fluids and minerals, activity models and homogenous and heterogeneous phase equilibria known and developed for natural silicon- and calcium-rich rock systems of various origin to predict the mineralogy and chemical behavior of Portland cements or derived compounds set in environments comparable to those encountered in geological settings such in metamorphism. plutonism and volcanism, as has been proposed previously in WO03/068708 for other cement compositions. Consequently, for a compositional system close to the desired Si—Al—Ca system, the main targeted minerals are anorthite, grossular (garnet) with as possible others minerals like wollastonite or other very high temperature anhydrous minerals stable at high temperature in the considered system like melilite. In presence of iron and magnesium, mineral of the $FeO-Fe_2O_3-MgO-CaOSiO_2-Al_2O_3-H_2$ can appear in high temperature conditions like pyroxene of the diopside-hedenbergite or garnet solid-solutions as shown in FIG. 1.

The method provides cement slurries or grout compositions that promote anorthite formation above 250° C., during the hydration of cement slurry, by adding specific modifiers containing aluminum and silicon in stochiometric proportions. If the set cement is heated at higher temperatures, up to 1200° C., anorthite, calcium rich garnet (grossular,) and wollastonite, become the main stable binders of set cement as observed in some skarns in high temperature geological contexts. This process can be used to create temperature-resistant articles made from cement in accordance with the invention.

However, the physics of optimizing the packing between the different particles used to modify Portland cement composition has to be mastered to control the final set cement permeability and density. The particle size distribution of each component is optimized to obtain a high packing volume fraction and hence a high solids content to the composition. For example, the solid components can be provided in three or more distinct particle size fractions to optimize the amount of solids in the mixture. This technique allows the use of large amounts of solids while making the slurry still easily pumpable. The methods described in EP 0 621 247 can be followed to achieve this.

Portland cement can conveniently be used as the hydraulic binder, although other forms of cement of reactive hydraulic binders such as slag materials can also be used. Cenospheres or other hollow particulate material of very low density (0.7 to 0.8 sg or lower) can be added to decrease the slurry density. The use of this hollow material allows the formation of a porous structure permitting easier escape of vapor pressure when the temperature increases. These hollow particles also contribute to the modification of Portland cement bulk composition to reach the target formulation by virtue of their chemical composition (typically being alumino-silicate materials). Silica flour and others aluminum modifiers can be also add to finally reach the desired bulk composition.

As well as temperature-resistance, cement compositions according to the present invention can be provided which demonstrate considerably lower pH than conventional cements, i.e. as low as pH 8.5. Such cements can be particularly useful in situations which encounter relatively low pH environments (e.g. pH<7) in which the highly basic nature of conventional cements can cause problems due to reactivity.

The present invention will now be described by way of examples, with reference to the accompanying drawings, in which:

FIG. 1 shows mineral phases known to be stable in natural calcium-rich systems plotted of in the $CaO-Al_2O_3-SiO_2$ ternary diagram ($H_2O$ in excess, FeO, $Fe_2O_3$ and MgO possibly present). These comprise:

anhydrous mineral stable at high temperature: xonotlite/wollastonite, grossular (and the almandin-andradite-pyrope solid solution), anorthite, melilite, Larnite (clinker phase);

moderately hydrous minerals stable at medium temperature: wairakite, prehnite, epidote, margarite, vuagnatite, portlandite;

conventional phase encountered in cement when submitted to low and medium temperature conditions: truscotite/bredigite, tobermorite, C2HS; and low and high temperature minerals from the Fe—Mg—Si—Al—Ca system projected in the Si—Al—Ca plane and liable to appears if Fe and Mg are present: truscotite/bredigite, diopside/hedenbergite, merwinite, vesuvianite, melilite.

Class G Cement is Also Plotted for Reference.

Figure 2A:
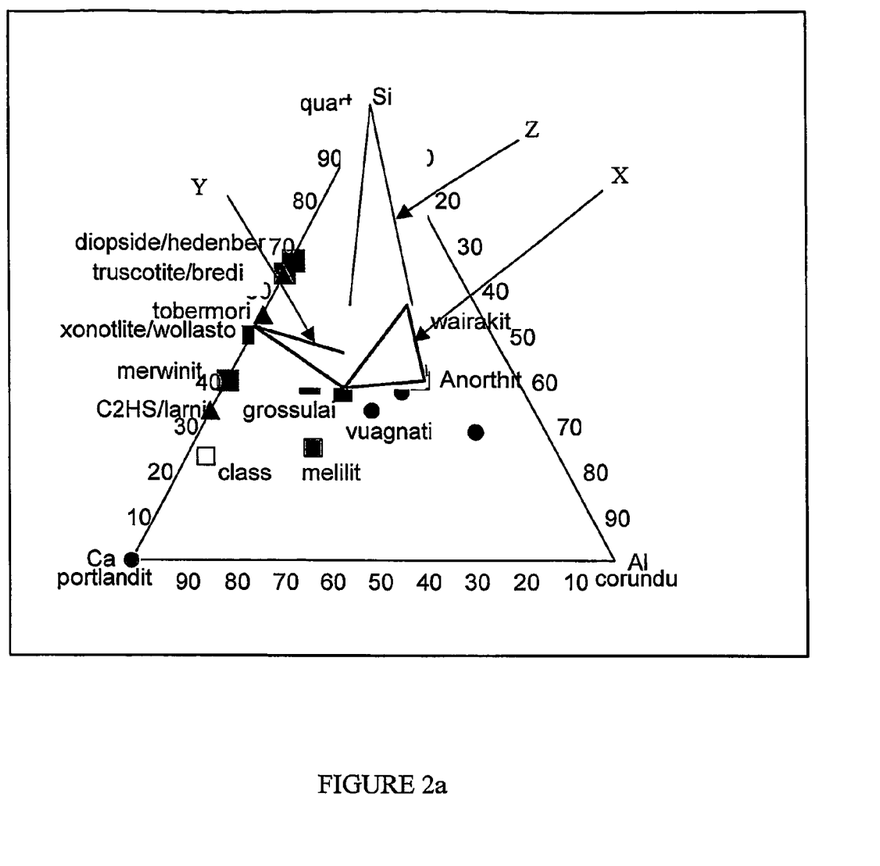
FIGS. 2a and 2b show certain stable mineral phases, examples of compositions of the present invention and comparative examples in the $CaO-Al_2O_3-SiO_2$ ternary diagram.
Figure 2B:
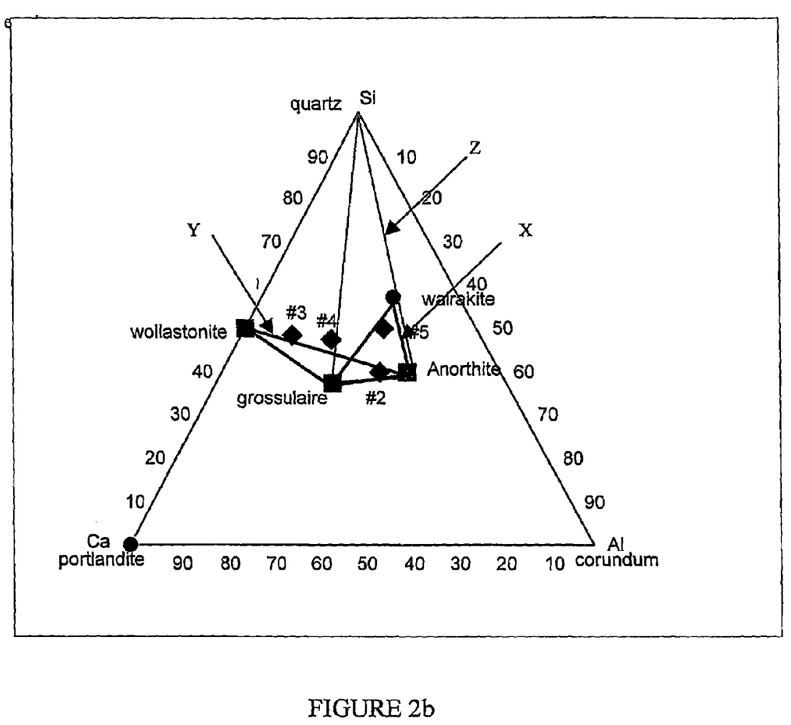

FIG. 2a shows possible stable phase relations in the considered system for different temperature conditions such as the wairakite-grossular-anorthite assemblage (X) stable at moderate temperature conditions (250-350° C.) and the wollastonite-grossular-anorthite (Y) and quartz-grossular-anorthite (Z) assemblages stable in high temperature conditions 350-900° C.; and wollastonite-melilite-anorthite assemblages stable at higher temperature conditions up to 1200° C. (W). FIG. 2b plots tested, formulations #2, #3. #4 and #5 with respect to assemblages X, Y and Z.

Figure 3:
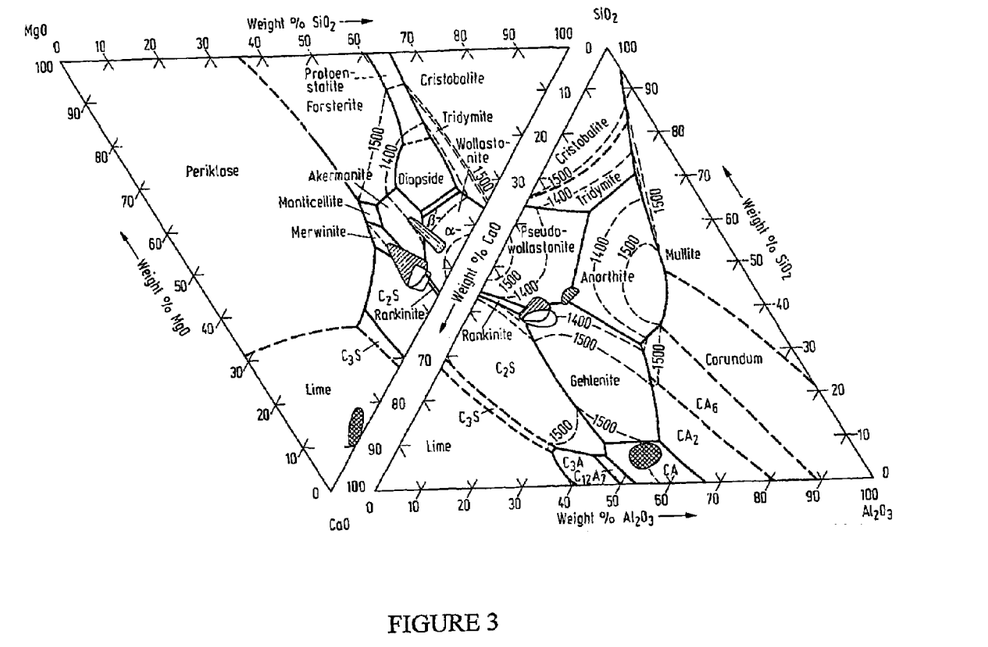
FIG. 3 shows the liquidus surface and compatibility relations of the $CaO-Al_2O_3-SiO_2$ and $CaO-MgO-SiO_2$ system for different assemblages.

FIG. 3 shows the liquidus surface and compatibility relations of the $CaO-Al2O3-SiO2$ and $CaO-MgO-SiO2$ systems showing the temperature of the appearance of the last melting in the solid for different assemblages (after phase diagrams for Ceramist: American Ceram. Soc. 1956, 1964, 1969 in Slag Atlas 1995 Verlag Stallleisen GmbH, D-Dusseldorf). The pure anorthite melting point is located at 1265° C. while the firstmelting in the solid appeal's at 1170° C. for silica rich compositions (cristobalite-wollastonite-anormite assemblage) and 1265° C. for more alumina rich compositions (anorthite-melitite (gehlinite)-wollastonite assemblages) compatible with the more aluminous cements compositions shown FIG. 2.

Figure 4:
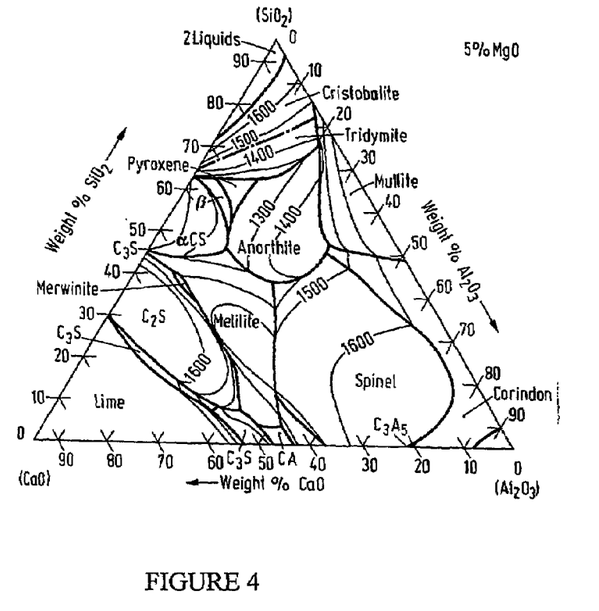
FIG. 4 shows the liquidus surface in the $CaO-Al2O3-SiO2$ system for an addition of 5% MgO.

FIG. 4 shows the effect of an adding of 5% in weight of MgO in the system $CaO-Al2O3-SiO2$ and the resulting change in mineralogy along the Liquidus (after Cavalier, Sandreo-Dendon 1960 in Slag Atlas 1995 Verlag Stahleisen GmbH, D-Dtisseldorf).

Figure 5:
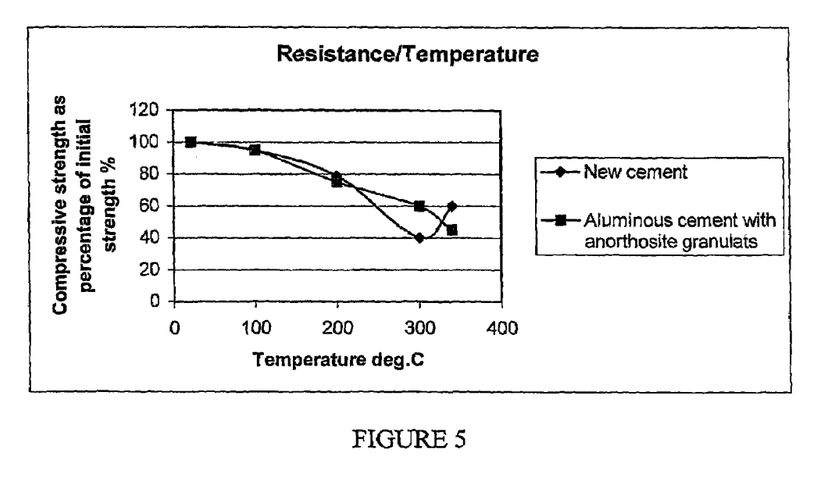
FIG. 5 shows a plot of the strengths of the cement compositions according to the invention compared to those of prior art cements.

FIG. 5 shows the strengths of the new modified Portland cement according to the invention compared to the ones obtained with high-alumina cement concretes made with anorthosite aggregates, as a function of temperature. The cement according to the invention, without aggregates, shows an equivalent tendency for temperatures up to 500° C. than the concrete already optimized for high temperature application in the construed on using temperature-resistant aggregates.

Various cement blends are prepared to demonstrate the present invention. Table 1 summarizes the blend composition (ratio Si/Al/Ca), the slurry density, the water/cement ratio and the solids volume fraction (porosity). All slurry properties are measured as per API specifications (API Recommended Practice for testing Oil-Well Cements and cement Additives (1990) API Spec. 10 Fifth Edition (Jul. 01, 1990)). The compositions of blends #0. #2. #3. #4 and #5 in the quaternary system (CaO—SiO2-Al$_2$O$_3$-H$_2$O) are shown in FIG. 2b.

TABLE 1

Properties of the slurries

| | #0# | #3 | #4 | #5 | #2 |
|---|---|---|---|---|---|
| Ratio Si/Al/Ca | 47/3/50 | 51/13/36 | 48/20/33 | 50/30/20 | 44/32/24 |
| Density (g · cm$^{-3}$) | 1.84 | 1.49 | 1.49 | 1.49 | 1.74 |
| Water/Cement ratio | 0.5 | 0.79 | 0.72 | 0.86 | 1.34 |
| Solids Volume Fraction % | 41 | 54 | 59 | 55 | 41 |
| Free Water | 0 | 0 | 0 | 0 | 0 |
| Blend | Cement Silica flour — — | Cement Silica flour Cenospheres — | Cement Silica flour Cenospheres Aluminum modifier | Cement Silica flour Cenospheres Aluminum modifier | Cement Silica flour — Aluminum modifier |

The slurries are mixed following the API procedure. Mixing is done in a Warring Blender. All solid components are dry blended before being added to the water containing the liquid additives.

Once the slurry design has been optimized, samples are prepared for curing by pouring the mixed slurry into a 5 cm×5 cm×5 cm steel molds. Five cubes are prepared for each formulation. The molds containing the slurries are cured for three days at 150° C. over 21 MPa in a standard oil well cement-curing chamber in water. The temperature is gradually increased to 300° C. over a 6-8 hour heat up period, to minimize possible cracking of the samples due to thermal expansion. The temperature is maintained at 300° C. over 21 MPa for 5 or 28 days, after which the system is allowed to cool down to room temperature. Samples are then removed, kept under water at room temperature before being tested for the following physical property measurements. The Uniaxial compressive strength is performed on 2.5×5 cm cores in using a load frame.

Samples are also cured in high temperature refractory furnace at different temperatures up to 1200° C. In order to demonstrate the benefits of the present invention, two compositions are selected having substantially the same density, same particles and similar porosity: 51/13/36-#3 (comparative example) and one close to the recommended compositions, and 48/20/32-#4 (present invention). Mmeralogical examination is carried out by x-ray powder diffraction using CuKα radiation. Scanning Electron Microscope images are used to describe morphologies of reaction products and to complete the XRD analysis.

The results of the mineralogical composition of the different samples are presented in the following table 2.

| | Formulation Number | | | | |
|---|---|---|---|---|---|
| | #0 | #3 | #4 | | #5 | #2 |
| Ratio Si/Al/Ca | 47/3/50 | 51/13/36 | 48/20/32 | | 50/30/20 | 44/32/24 |
| Density g/cm$^3$ | 1.84 | 1.49 | 1.49 | | 1.49 | 1.73 |
| Aluminum modifier type | — | — | A | B | B | B |
| Xonotljte C$_6$S$_6$H | ++++ | ++++ | + | ϵ | ϵ | ϵ |
| Anorthite CaAl$_2$Si$_2$O$_8$ | — | ϵ | ++ | +++ | +++ | +++ |
| Truscotite | — | — | — | + | — | — |
| Wairakite | — | — | + | — | — | — |
| Quartz SiO2 | — | — | — | — | ϵ | ϵ |
| Corundum μAl$_2$O$_3$ | — | — | — | ~ | — | — |
| Compressive Strength (MPa, psi) at 300° C. | | | | | | |
| after 5 days | 13.5 (1960) | — | — | 38 (3147) | 38 (5511) | 11.1 (1610) |
| after 28 days | 32 (4600) | 17.3 (2500) | 14.5 (2100) | 18 (2600) | 18 (2600) | — |

++++ Prevailing phase; +++ phase in appreciable amount; ++ phase in fairly good amount; + phase in small amount The set cement cores from blends #3 and #4 are cured one month at 300° C. are then cut as smaller samples and cured in high temperature furnace. The set cement sample from blend #4 has been, observed and analyzed by XRD and SEM (Xray analysis and BSE imaging) after different curing durations, FIGS. 6-18 are photographs of the set cement from the two blends, #3 and #4 after curing at 300° C. (58 days), 600° C. (9 days), 750° C. (30 days), 900° C. (9 days) and 1200° C. (9 days) are presented.

Figure 6:
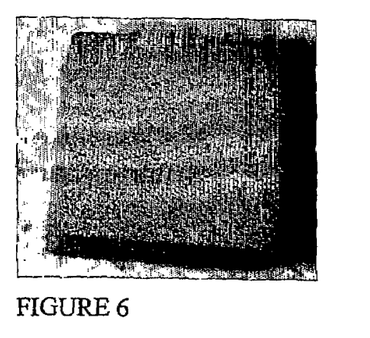
FIGS. 6-18 show photographs of cement samples after being subjected to various temperatures over periods of time.
Figure 7:
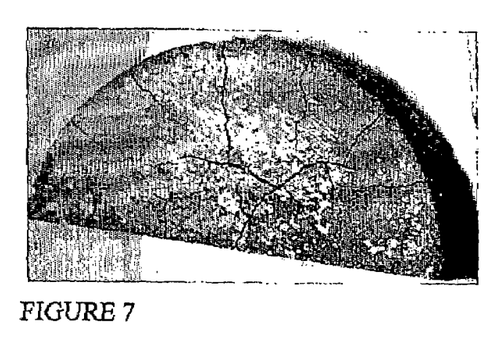

FIGS. 6 and 7 show #4 and #3 after 58 days at 300° C. For the system #3, cracks and many deleterious signs are well observed after 2 months at 300° C. in the refractory furnace. For the new system from the slurry #4, integrity is maintained.

Figure 19:
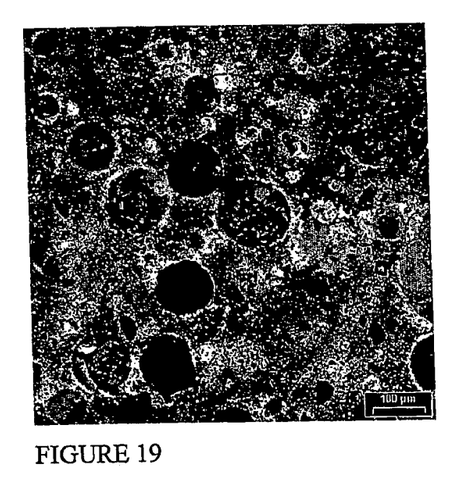
FIGS. 19-29 show micrographs of various cement samples.
Figure 20:
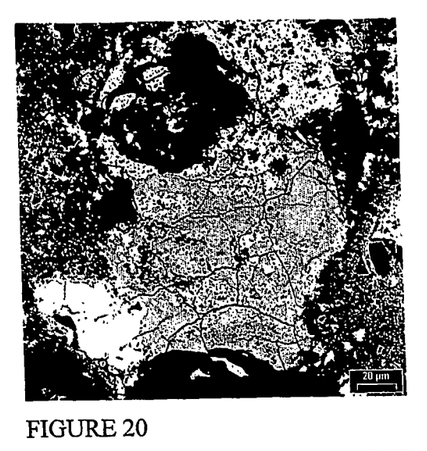
Figure 21:
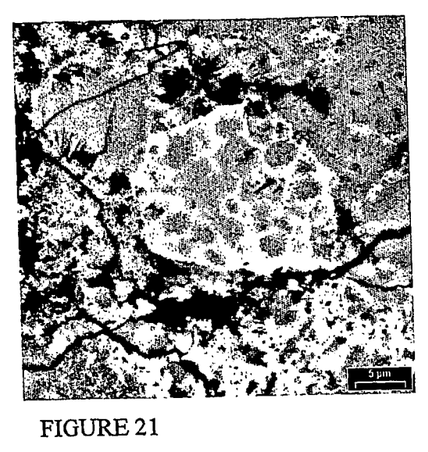

FIG. 19 is a micrograph of a thin section cut in the set cement from blend #4 after 58 days at 300° C., showing general high porosity, cenosphere relics and anorthite as main binder forming the wall of cenospheres and the matrix. FIG. 20 shows details of this micrograph showing an anorthite cenosphere and assemblage anorthite-garnet (grossular-andradite) growing inside wairakite crystal relic. FIG. 21 is a close-up on anorthite overprint inside wairakite crystal.

Figure 8:
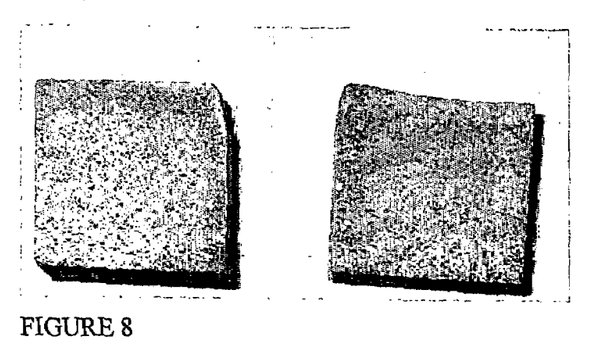
Figure 9:
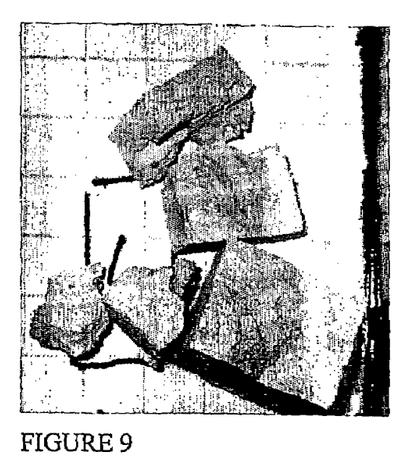
Figure 10:
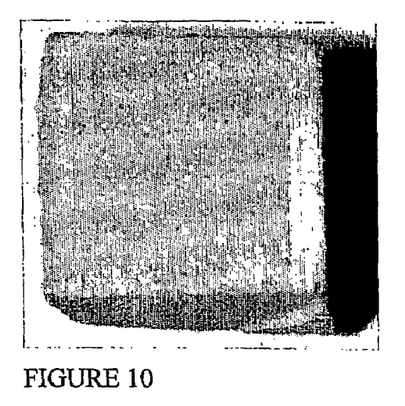
Figure 11:
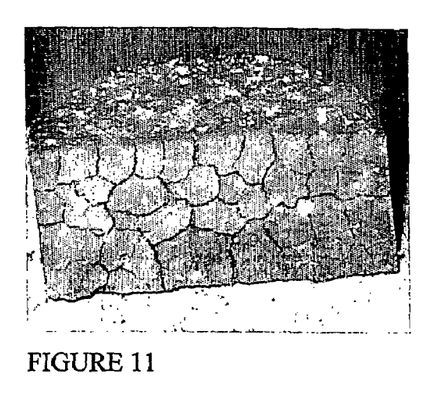
Figure 22:
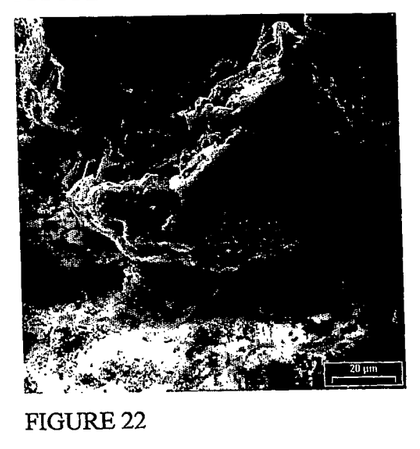

FIGS. 8 and 9 show corresponding samples after 9 days at 600° C. The set cement sample #4 is cut again with a small saw. Very consistent slices are obtained and no sign of degradation is observed even after one week at 600° C. (FIG. 8). Anorhtite and garnet are the main binders and wairakite disappears. FIG. 22 is a micrograph showing garnet in the set cement matrix after one week at 600° C. For #3, the set cement sample is completely disintegrated and friable and it is not possible to saw it as it has been done with #4 (FIG. 9). FIGS. 10 and 11 show corresponding samples after 9 days at 750° C. Again, #4 maintains its integrity, unlike #3.

Figure 12:
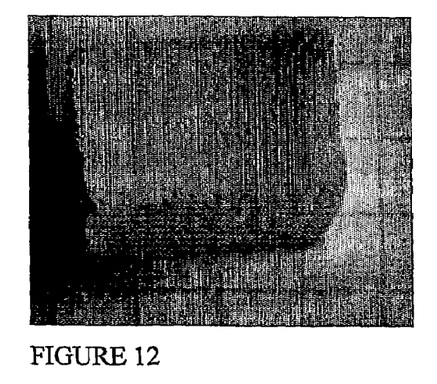
Figure 13:
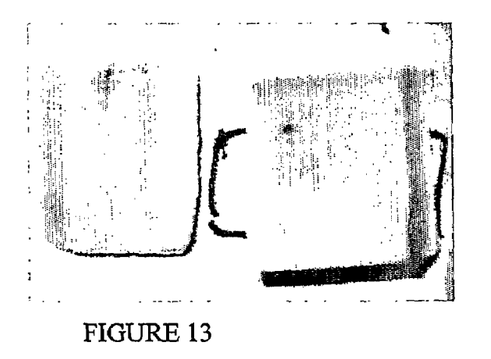
Figure 14:
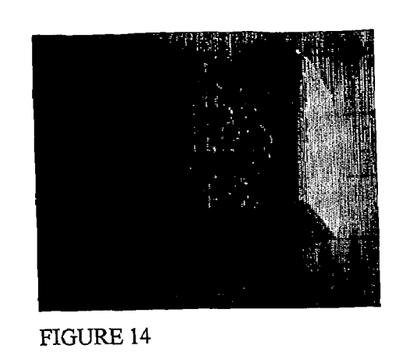
Figure 23:
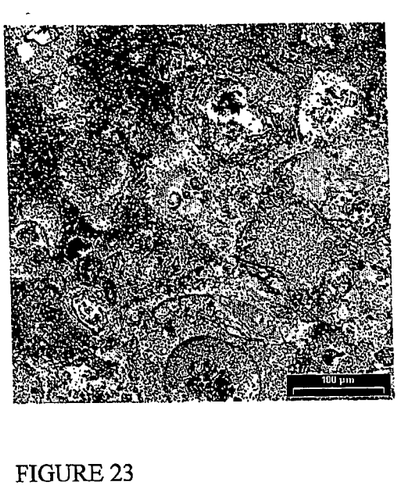
Figure 24:
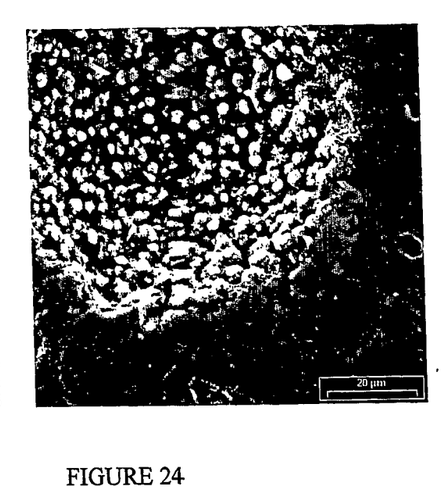
Figure 25:
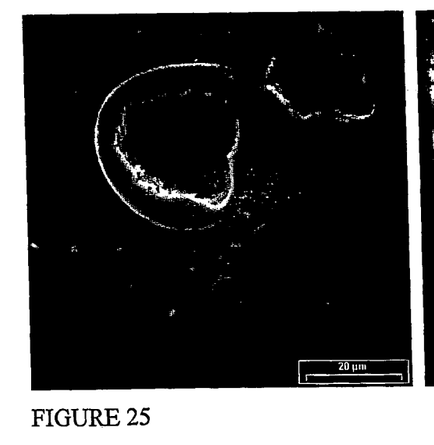
Figure 26:
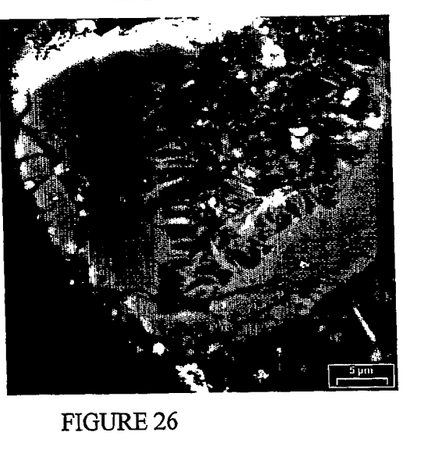

FIGS. 12, 13 and 14 show corresponding samples after 9 days at 900° C. FIG. 12 show the entire sample #4 and FIG. 13 the sample after cutting. The sample maintains good integrity and can be cut without splitting. Anorthite and wollastonite remain the main binders, and garnet is still present. FIGS. 23 and 24 show a micrograph. (BSE imaging) of a thin section cut in set cement from blend #2 after 9 days at 900° C. showing anorthite in set cement matrix and in the wall of hollow microspheres (FIG. 24). FIGS. 25 and 26 show close-up (SE imaging) of some hollow microspheres in the same sample constituted by a pyroxene of the hedenbergite-diopside solid-solution. FIG. 14 shows #3 which has many cracks and deterioration signs and color variations.

Figure 15:
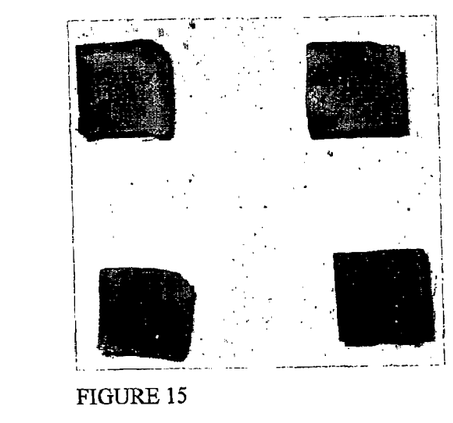
Figure 16:
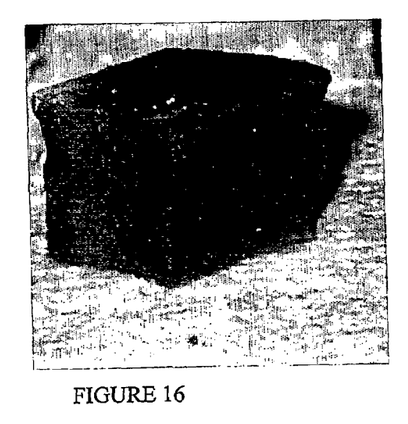
Figure 17:
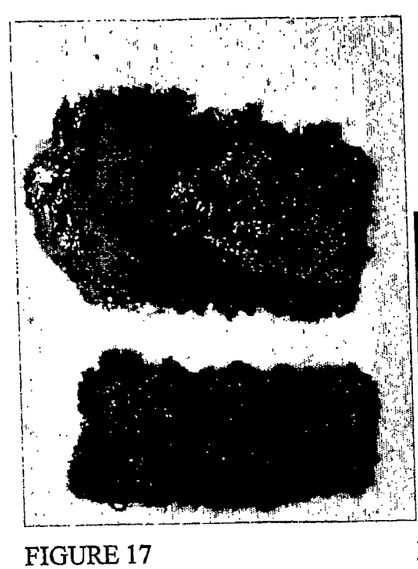
Figure 18:
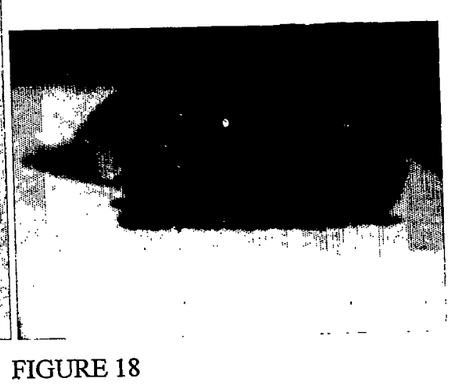
Figure 27:
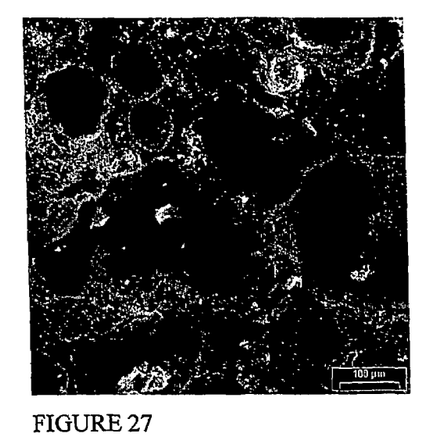
Figure 28:
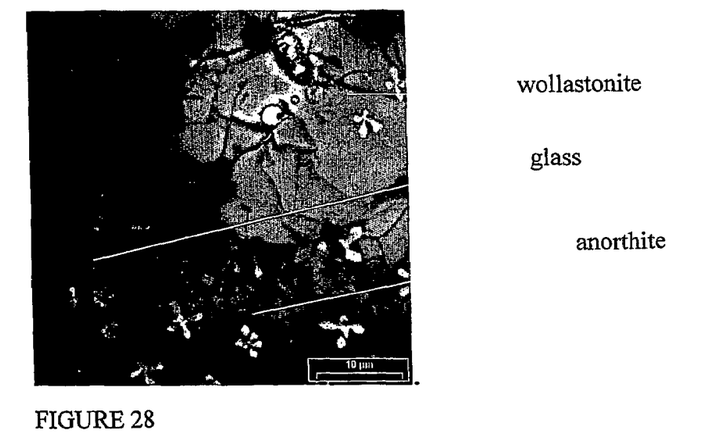
Figure 29:
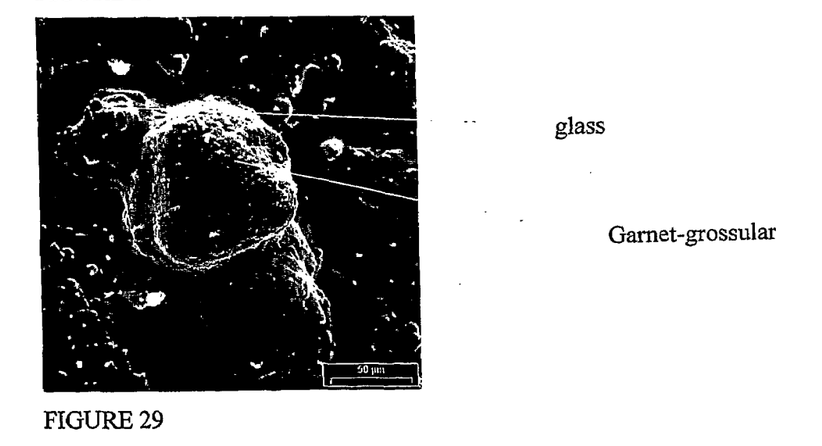

FIGS. 15 and 16, and 17 and 18 show corresponding samples after 9 days at 1200° C. FIGS. 15 and 16 show that the sample #4 maintains its integrity with a high hardness despite of some signs of melting and some size reduction. Anorthite is still the main binder. Wollastonite and garnet grossular are also observed together with glass. FIG. 27 is a micrograph (SE imaging) of thin section of set cement from blend #4 after one week at 1200° C. showing the hollow sphere relics and the good remaining integrity of the new formulation even at 1200° C. FIG. 28 is a micrograph (SE imaging) showing anorthite and glass in the matrix with a wollastonite crystal (stars are artifacts due to the sample preparation for SEM examination).) As predicted, the first melting appears in this sample heated one week at 1200° C. FIG. 29 shows garnet-grossular crystal at the surface of the sample and covered by anorthite crystals covered in glass. FIGS. 17 and 18 shows sample #3 severely damaged due to melting after 9 days at 1200° C.

The composition of cements according to the present invention between 300 and 1200° C. is mainly anorthite. At 300° C., anorthite is the main binder with wairakite present with the initial aluminum modifier. The presence of wairakite is related to the reaction kinetic due to the aluminum modifier reactivity.

The very high temperatures curing performed in air inside a refractory furnace and shows the good stability of the compositions according to the invention even at very high temperature. This stability is principally due to the presence of anorthite which is known to begin to melt only at around 1265° C.

The present invention provides mixable lightweight formulations having good mechanical properties which can use conventional Portland cement for temperatures up to 1200° C. and more if modified using the former rules. As these formulations are based on conventional Portland cements good workability can be obtained using techniques widely found in the construction and well cementing industries. Also, parts can be precast using known techniques.

The invention claimed is:

1. A heat-resistant concrete comprising aggregates embedded with a cementing matrix based on Portland cement and on mineral additives contributing silicon, calcium and aluminum oxides, so that the mineral composition of the matrix mixture lies in the xonotlite/wollastonite-grossular-anorthite triangle or in the grossular-anorthite-quartz triangle in the Si-Ca-Al phase diagram, so that the formation of anorthite is promoted when the set concrete is exposed to temperatures between 250°C and 1200°C.

2. The concrete of claim 1, wherein the mineral composition of the matrix mixture lies in the area overlapping both the xonotlite/wollastonite grossular-anorthite triangle and the grossular-anorthite-quartz triangle in the Si-Ca-Al phase diagram.

3. The concrete of claim 1, wherein the aggregates are heat-resistant.

4. The concrete of claim 1, wherein the mineral additives further contribute iron and/or magnesium.

5. The concrete according to claim 4, wherein the cumulative amount of iron oxides and of magnesium oxides is between 1 and to 5% of the total weight of the mineral composition.

6. The concrete of claim 1 wherein all solids constituting the cementing matrix are provided in at least three distinct particle size fractions in volume ratio such that the packing volume fraction of the solids is optimized.

7. The concrete of claim 1, wherein at least part of the mineral additives is added under the form of alumino-silicate hollow spheres to favor escape of vapor pressure when the concrete is submitted at high temperature.

8. The concrete of claim 2, wherein the aggregates are heat-resistant.

9. The concrete of claim 2, wherein the mineral additives further contribute iron and/or magnesium.

10. The concrete of claim 3, wherein the mineral additives further contribute iron and/or magnesium.

11. The concrete of claim 9, wherein the cumulative amount of iron oxides and of magnesium oxides is between 1 and to 5% of the total weight of the mineral composition.

12. The concrete of claim 2 wherein all solids constituting the cementing matrix are provided in at least three distinct particle size fractions in volume ratio such that the packing volume fraction of the solids is optimized.

13. The concrete of claim 3 wherein all solids constituting the cementing matrix are provided in at least three distinct particle size fractions in volume ratio such that the packing volume fraction of the solids is optimized.

14. The concrete of claim 4 wherein all solids constituting the cementing matrix are provided in at least three distinct particle size fractions in volume ratio such that the packing volume fraction of the solids is optimized.

15. The concrete of claim 5 wherein all solids constituting the cementing matrix are provided in at least three distinct particle size fractions in volume ratio such that the packing volume fraction of the solids is optimized.

16. The concrete of claim 2, wherein at least part of the mineral additives is added under the form of alumino-silicate hollow spheres to favor escape of vapor pressure when the concrete is submitted at high temperature.

17. The concrete of claim 3, wherein at least part of the mineral additives is added under the form of alumino-silicate hollow spheres to favor escape of vapor pressure when the concrete is submitted at high temperature.

18. The concrete of claim 4, wherein at least part of the mineral additives is added under the form of alumino-silicate hollow spheres to favor escape of vapor pressure when the concrete is submitted at high temperature.

19. The concrete of claim 5, wherein at least part of the mineral additives is added under the form of alumino-silicate hollow spheres to favor escape of vapor pressure when the concrete is submitted at high temperature.

* * * * *